US009437965B2

(12) United States Patent
Zitsch et al.

(10) Patent No.: US 9,437,965 B2
(45) Date of Patent: Sep. 6, 2016

(54) CONNECTOR HAVING COUPLING MECHANISM

(71) Applicant: Tyco Electronics Corporation, Berwyn, PA (US)

(72) Inventors: Dwight David Zitsch, Carlisle, PA (US); James Patrick Mosier, Palmyra, PA (US); Soren Grinderslev, Hummelstown, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 121 days.

(21) Appl. No.: 14/255,662

(22) Filed: Apr. 17, 2014

(65) Prior Publication Data
US 2014/0227900 A1 Aug. 14, 2014

(51) Int. Cl.
H01R 13/62 (2006.01)
H01R 13/622 (2006.01)
H01R 13/629 (2006.01)
H01R 13/533 (2006.01)
H01R 107/00 (2006.01)
G02B 6/38 (2006.01)
H01R 24/28 (2011.01)

(52) U.S. Cl.
CPC .......... H01R 13/62 (2013.01); G02B 6/3878 (2013.01); H01R 13/622 (2013.01); H01R 24/28 (2013.01); G02B 6/3894 (2013.01); G02B 6/3895 (2013.01); H01R 13/533 (2013.01); H01R 13/629 (2013.01); H01R 2107/00 (2013.01)

(58) Field of Classification Search
CPC .. H01R 13/533; H01R 13/62; H01R 13/622; H01R 13/623; H01R 13/625

USPC .................................. 439/372, 296
See application file for complete search history.

(56) References Cited

U.S. PATENT DOCUMENTS 3,611,260 A * 10/1971 Colardeau ............ H01R 13/625
439/317
4,183,605 A 1/1980 Arneson
4,457,572 A 7/1984 Frazier et al.
(Continued)

FOREIGN PATENT DOCUMENTS

EP 2 390 966 A2 11/2011
EP 2 395 609 A2 12/2011
(Continued)

OTHER PUBLICATIONS

International Search Report, International Application No. PCT/US2015/025683, International Filing Date, Apr. 14, 2015.

*Primary Examiner* — James Harvey
*Assistant Examiner* — Oscar C Jimenez

(57) ABSTRACT

A connector includes a shell having a mating end configured to be mated with a mating connector and that holds at least one contact. A coupling mechanism is rotatable about the shell. The coupling mechanism includes an inner coupling nut and an outer coupling nut separate from the inner coupling nut. The inner coupling nut has threads configured to be threadably coupled to a mating connector. The inner coupling nut has a track defined by track walls formed into an outer surface of the inner coupling nut. The outer coupling nut has a cavity receiving the inner coupling nut. The outer coupling nut has a post extending into the cavity and being received in the track. The post engages the track walls and is released from the track wall into the track when the connector is fully mated to the mating connector.

20 Claims, 8 Drawing Sheets

(56) References Cited

U.S. PATENT DOCUMENTS

| | | | | |
|---|---|---|---|---|
| 4,464,001 | A | * | 8/1984 | Collins ................ H01R 13/625 439/318 |
| 4,478,473 | A | * | 10/1984 | Frear ................... H01R 13/622 439/312 |
| 4,531,802 | A | * | 7/1985 | Tomsa ................. H01R 13/625 439/314 |
| 4,629,272 | A | * | 12/1986 | Mattingly ............ H01R 13/625 439/318 |
| 6,561,841 | B2 | * | 5/2003 | Norwood ............. H01R 13/641 439/286 |
| 2013/0072048 | A1 | | 3/2013 | Schafer et al. |
| 2013/0244466 | A1 | * | 9/2013 | Cole ................... H01R 13/533 439/312 |

FOREIGN PATENT DOCUMENTS

| | | |
|---|---|---|
| EP | 2 503 650 A1 | 9/2012 |
| FR | 2 549 303 A2 | 1/1985 |

\* cited by examiner

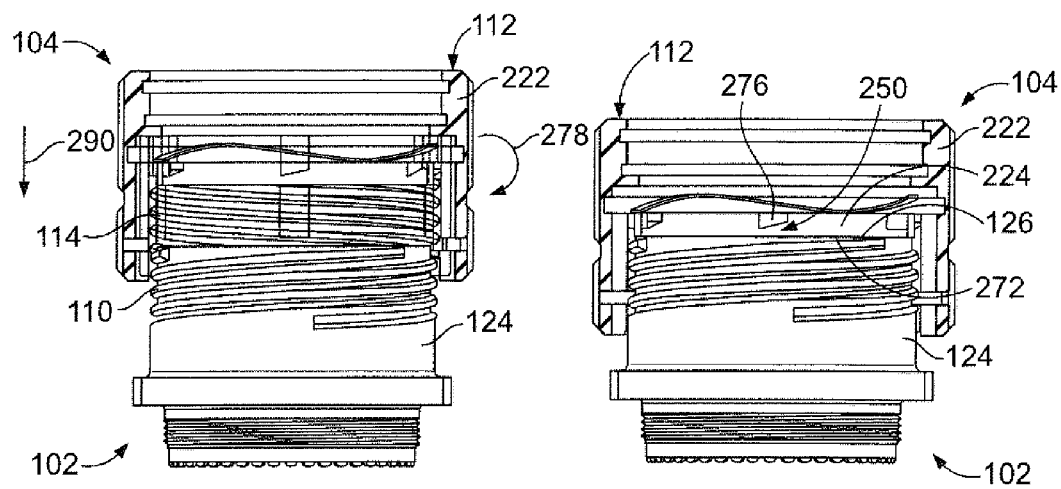
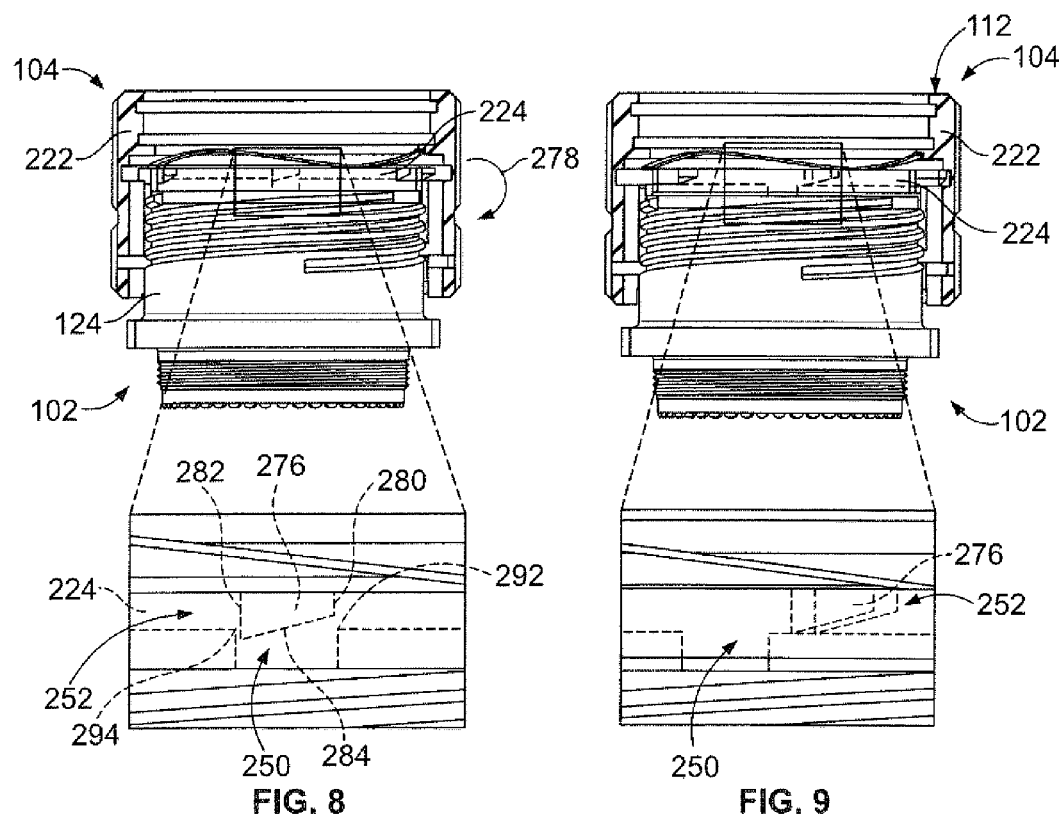

CONNECTOR HAVING COUPLING MECHANISM

BACKGROUND OF THE INVENTION

The subject matter herein relates generally to a connector having a coupling mechanism.

With the increasing demands on and complexity of modern electronic systems in high reliability applications such as military and aerospace, there is a continuing need to incorporate more electronic equipment into a confined space, while at the same time ensuring reliability in harsh environments. In such applications, connector systems provide a critical communication link between physically separated electronic devices. Connector systems have to satisfy many competing requirements. For example, connectors may need to be capable of withstanding a rugged environment that includes vibration, wide temperature swings, moisture, and exposure to hazardous materials and chemical contaminants. Connectors may need to be compact to permit many interconnections to be made within a small area and include a number of individual pieces.

Connectors may need to provide feedback to the installer to ensure that the connectors are properly and/or fully mated. For example, connectors may include visual indicators, such as a line on one of the connectors that needs to be covered by the other connector to indicate that the connectors are fully mated. However, in some environments, it may be difficult or impossible to visually see if the connectors are fully mated. For example, in densely populated areas of the system, the connectors may be positioned in close proximity to other components, making it difficult to visualize the indicators. Furthermore, some applications require blind mating of the connectors. Additionally, when using tools to install the connectors, it is possible that the connectors may be damaged or destroyed during mating, such as from overtightening. Components of the connectors, such as the contacts, may be bent or improperly mated, which may increase the mating force, falsely indicating to the installer that the connectors are fully mated. Additionally, foreign object debris between the connectors may lead to high mating forces, again falsely indicating to the installer that the connectors are fully mated.

A need remains for an improved coupling mechanism capable of providing installer feedback of proper mating of the connectors.

BRIEF DESCRIPTION OF THE INVENTION

In one embodiment, a connector is provided having a shell having a mating end configured to be mated with a mating connector that holds at least one contact. A coupling mechanism is rotatable about the shell. The coupling mechanism includes an inner coupling nut and an outer coupling nut separate from the inner coupling nut. The inner coupling nut has threads configured to be threadably coupled to a mating connector. The inner coupling nut has a track defined by track walls formed into an outer surface of the inner coupling nut. The outer coupling nut has a cavity receiving the inner coupling nut. The outer coupling nut has a post extending into the cavity and being received in the track. The post engages the track walls and is released from the track wall into the track when the connector is fully mated to the mating connector.

In another embodiment, a connector is provided including a shell having a mating end configured to be mated with a mating connector and that holds at least one contact. A coupling mechanism is rotatable about the shell. The coupling mechanism includes an inner coupling nut and an outer coupling nut separate from the inner coupling nut. The inner coupling nut has threads configured to be threadably coupled to a mating connector. The inner coupling nut has a track defined by track walls formed into an outer surface of the inner coupling nut. The track includes a circumferential groove, a tightening slot extending from the circumferential groove and an untightening slot extending from the circumferential groove. The outer coupling nut has a cavity receiving the inner coupling nut. The outer coupling nut has a post extending into the cavity that is received in the track. The post is received in the circumferential groove to allow the outer coupling nut to rotate freely relative to the inner coupling nut. The post is received in the untightening slot during rotation of the outer coupling nut in an untightening direction to force the inner coupling nut to rotate in the untightening direction. The post is received in the tightening slot during rotation of the outer coupling nut in a tightening direction to force the inner coupling nut to rotate in the tightening direction.

BRIEF DESCRIPTION OF THE DRAWINGS

FIGS. 6 through 11 illustrate an exemplary mating and un-mating sequence of the plug and receptacle.

DETAILED DESCRIPTION OF THE INVENTION

Embodiments described herein may include ruggedized connectors capable of withstanding a rugged environment that includes vibration, wide temperature swings, moisture, and exposure to hazardous materials and chemical contaminants. Embodiments described herein may include connectors that are compact to permit the connector to be located in a small area and/or to permit many connectors to be provided in a small area. Embodiments described herein may include a connector having matched impedance shielded contact pairs for high-speed data transmission. Embodiments described herein may provide connectors that have high quality electrical characteristics, such as matched impedance, very low signal loss, minimal cross talk and the like. Embodiments described herein may provide connectors having high quality optical characteristics, such as low optical coupling loss and back reflections.

Embodiments described herein may provide connectors having a coupling mechanism that provides verified connector engagement to the installer. Embodiments described herein may provide connectors that allow for blind mating thereof. Embodiments described herein may provide connectors that have tactile and audible feedback that the connectors are fully mated. Embodiments described herein may provide connectors that cannot be over-tightened. Embodiments described herein may provide feedback to the installer when a rigid obstruction is preventing proper mating. Embodiments described herein may be retrofit to existing standard connectors.

Figure 1:
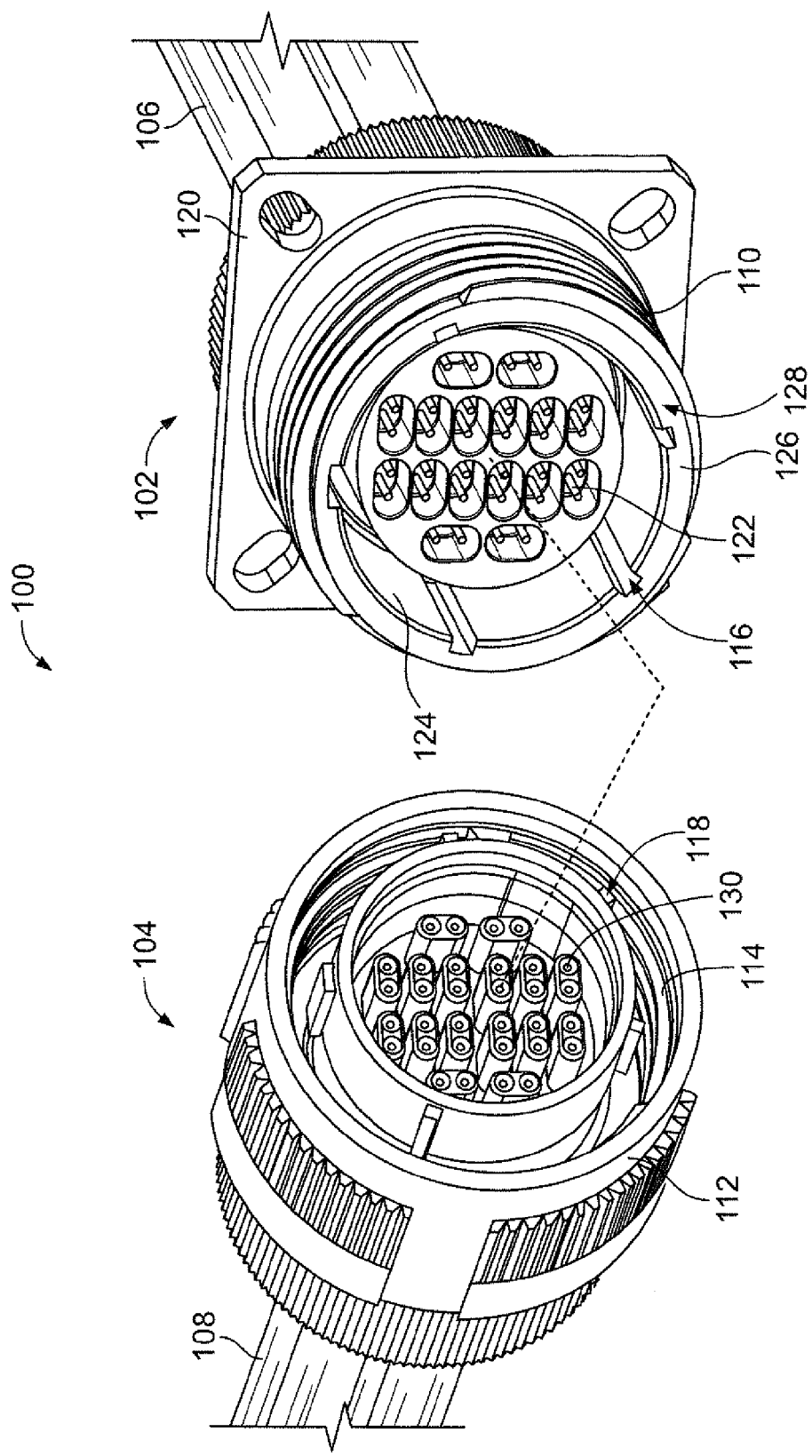
FIG. 1 illustrates a connector system formed in accordance with an exemplary embodiment.

FIG. 1 illustrates a connector system 100 formed in accordance with an exemplary embodiment. The connector system 100 includes a first connector 102 and a second connector 104 arranged to be coupled together to form a connection between one or more conductors. The connection may be an electrical connection, a fiber optic connection or another type of connection. The connection may be a data communication connection or another type of connection, such as a power connection.

In an exemplary embodiment, the first and second connectors 102, 104 are cable mounted connectors provided at ends of corresponding cables 106, 108, respectively. Optionally, multiple cables 106 may be terminated to the connector 102. Optionally, multiple cables 108 may be terminated to the connector 104. The cables 106, 108 may be copper wire cables, fiber optic cables or other types of data communication cables. Optionally, each cable 106, 108 may include a plurality of individual wires terminated to corresponding conductors. In an exemplary embodiment, the wires may be arranged in pairs. Optionally, the wires may be twisted pairs. The connectors 102, 104 may provide electrical shielding for the conductors and/or wires and/or cables held therein. In an exemplary embodiment, each pair of conductors may be shielded from other pairs throughout the connectors 102, 104. In alternative embodiments, at least one of the connectors 102 and/or 104 may be mounted to a rigid or flexible circuit board rather than the cables 106, 108.

In an exemplary embodiment, the first connector 102 may include a receptacle configured to receive a portion of the second connector 104. The first connector 102 may be referred to hereinafter as a receptacle connector 102 or simply a receptacle 102. The second connector 104 is configured to be plugged into the first connector 102. The second connector 104 may be referred to herein after as a plug connector 104 or simply a plug 104. Either connector 102, 104 may be referred to as a mating connector. Portions of either connectors 102, 104 may be plugged into the other connector 102, 104. Portions of either connector 102, 104 may receive corresponding portions of the other connector 102, 104.

In an exemplary embodiment, the first and second connectors 102, 104 are coupled together by a threaded connection. The receptacle 102 includes an external thread 110. The plug 104 includes a coupling mechanism 112 that is rotatable and includes an internal thread 114. In alternative embodiments, the receptacle 102 may include internal threads and the coupling mechanism 112 may include external threads. The threads 110, 114 may extend greater than 360° in some embodiments. The threads 110, 114 may define a bayonet connection in some embodiments. The plug 104 is plugged into the receptacle 102 and the coupling mechanism 112 is threadably coupled thereto. The internal thread 114 of the coupling mechanism 112 engages the external thread 110 of the receptacle 102. The coupling mechanism 112 is rotated and tightened to secure the plug 104 to the receptacle 102. The coupling mechanism 112 may be untightened to unmate the connectors 102, 104.

In an exemplary embodiment, the connectors 102, 104 may include keying features. For example, the receptacle 102 may include keyways 116 that receive corresponding keys 118 of the plug 104. The keys 118 and keyways 116 may orient the plug 104 with respect to the receptacle 102. The keyways 116 and keys 118 may resist rotation of the plug 104 with respect to the receptacle 102 once mated. The keyways 116 and keys 118 may have different widths to orient the plug 104 with respect to the receptacle 102.

In an exemplary embodiment, the first connector 102 includes a mounting flange 120 used for mounting the first connector 102 to a flat surface, such as an item of electrical equipment, a utility rack, a junction box, a bulk head, a wall, a panel or another surface. A portion of the first connector 102 may extend through the item to which the mounting flange 120 is affixed, such as through an opening of such item.

Contacts 122 are held in the receptacle 102. In an exemplary embodiment, the contacts 122 are arranged in pairs. Optionally, the contacts 122 may carry differential pair signals. In the illustrated embodiment, the contacts 122 are pin contacts; however other types of contacts 122 may be used in alternative embodiments. Optionally, the contacts 122 may be fiber optic contacts. The fiber optic contacts may be axially biased, spring supported contacts, which may need a progressively increasing coupling torque to mate with corresponding contacts of the plug 104. The receptacle 102 includes a shell 124 having a leading edge 126 at a mating end 128 of the shell 124. During mating with the plug 104, the leading edge 126 is drawn into the plug 104 and is surrounded by the coupling mechanism 112. As will be described in further detail below, the leading edge 126 is used to automatically unlock the coupling mechanism 112 when the receptacle 102 and plug 104 are fully mated.

The plug 104 includes a plurality of contacts 130 held in the plug 104. The plug 104 may provide electrical shielding for the contacts 130. In an exemplary embodiment, the contacts 130 are arranged in pairs. Optionally, the contacts may be differential pairs. In the illustrated embodiment, the contacts 130 are socket contacts; however other types of contacts may be used in alternative embodiments, such as fiber optic contacts. The fiber optic contacts may be axially biased, spring supported contacts, which may need a progressively increasing coupling torque to mate with corresponding contacts 122 of the receptacle 102.

Figure 2:
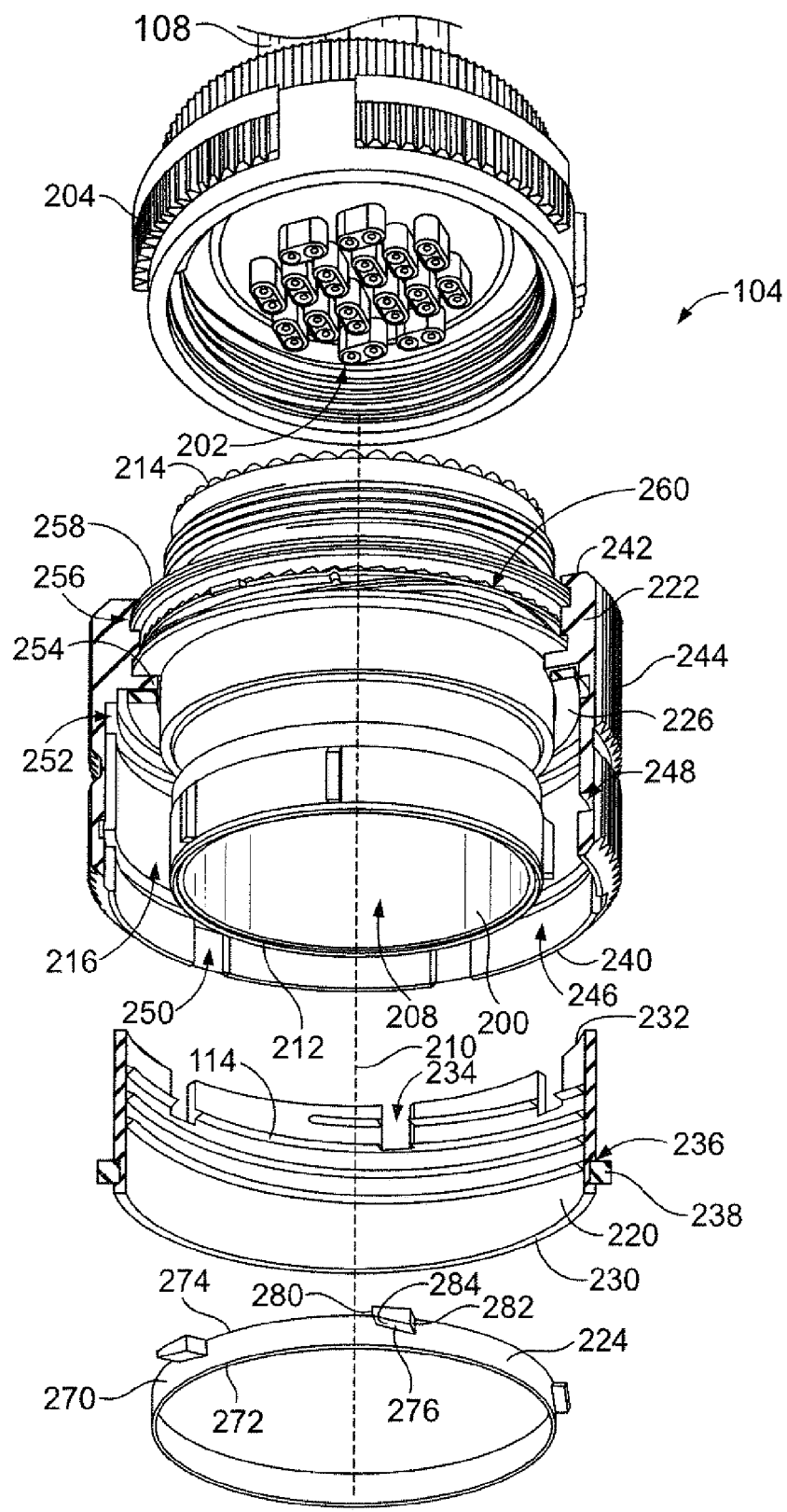
FIG. 2 is an exploded, partial sectional view of a plug of the connector system with a coupling mechanism formed in accordance with an exemplary embodiment.

FIG. 2 is an exploded, partial sectional view of the plug 104. The plug 104 includes the coupling mechanism 112 and a shell 200 which holds the contacts 130. Optionally, the contacts 130 may be part of an insert assembly 202, which includes a dielectric holder that holds the contacts 130 and that is loaded into the shell 200. A back shell 204 may be provided, such as to connect the shell 200 to the cable 108. The back shell 204, or other retention features, may be used to secure the insert assembly 202 within the shell 200. The cables 108 may pass through the back shell 204 for connection to the contacts 130.

The shell 200 includes a chamber 208 extending along a longitudinal axis 210 between a mating end 212 and a cable end 214 of the shell 200. The contacts 130 are positioned in the chamber 208. For example, the chamber 208 may be sized and shaped to receive the insert assembly 202. The mating end 212 is configured to be plugged into the receptacle 102 (shown in FIG. 1). The coupling mechanism 112 is coupled to the shell 200 and surrounds an exterior portion of the shell 200, such as at the mating end 212. A gap 216 is defined between the exterior of the shell 200 and the coupling mechanism 112. The mating end 128 (shown in FIG. 1) of the shell 124 (shown in FIG. 1) of the receptacle 102 is received in the gap 216 when mated.

The coupling mechanism 112 includes an inner coupling nut 220, an outer coupling nut 222 and a movable plunger 224 operably coupled between the inner coupling nut 220 and outer coupling nut 222. The plunger 224 is used to lock the inner coupling nut 220 to the outer coupling nut 222 during tightening of the coupling mechanism 112 for mating the plug 104 to the receptacle 102. The plunger 224 is configured to be unlocked when the coupling mechanism 112 is fully tightened and the plug 104 is fully mated to the receptacle 102. In an exemplary embodiment, the plunger 224 is automatically unlocked when the plug 104 is fully mated to the receptacle 102. During untightening, the plunger 224 again locks the outer coupling nut 222 to the inner coupling nut 220 to cause the inner coupling nut 220 to rotate in an untightening direction.

In an exemplary embodiment, a biasing mechanism 226 is used to bias the plunger 224 toward the locked position. The biasing force may be overcome during tightening of the coupling mechanism 112 until the plunger 224 is in the unlocked position. For example, the leading edge 126 (shown in FIG. 1) of the shell 124 of the receptacle 102 may engage the plunger 224 and push the plunger 224 to the unlocked position as the coupling mechanism 112 is tightened. Once unlocked, the inner coupling nut 220 is no longer rotated with the outer coupling nut 222, but rather, the outer coupling nut 222 spins about the inner coupling nut 220.

The inner coupling nut 220 includes a ring shaped body having the internal threads 114 on an interior of the inner coupling nut 220. The inner coupling nut 220 extends between a front 230 and a rear 232. The front 230 is configured to face the receptacle 102. The inner coupling nut 220 includes a plurality of slots 234 at the rear 232. The slots 234 are configured to receive portions of the plunger 224 to lock the plunger 224 to the inner coupling nut 220. When the plunger 224 is received in the slots 234, the plunger 224 may be locked relative to the inner coupling nut 220 such that rotation of the plunger 224 is transferred to the inner coupling nut 220.

In an exemplary embodiment, the inner coupling nut 220 includes a retaining ring grove 236 along an exterior of the inner coupling nut 220. A retaining ring 238 is received in the retaining ring groove 236 that is used to axially restrain the inner coupling nut 220 relative to the outer coupling nut 222. The outer coupling nut 222 is able to rotate relative to the inner coupling nut 222 on the retaining ring 238.

The outer coupling nut 222 has a ring shaped body that extends between a front 240 and a rear 242. The outer coupling nut 222 may include gripping features 244 on an exterior of the outer coupling nut 222. For example, the exterior surface of the outer coupling nut 222 may have a knurled surface. The gripping features 244 may be gripped by the installer to rotate the coupling mechanism 112, such as to tighten or untighten the coupling mechanism 112.

The outer coupling nut 222 includes an internal pocket 246 at the front 240 that receives the inner coupling nut 220. The outer coupling nut 222 includes a retaining ring groove 248 in the pocket 246 that receives the retaining ring 238 to axially secure the inner coupling nut 220 relative to the outer coupling nut 222. Features other than a retaining ring may be used to axially secure the outer coupling nut 222 relative to the inner coupling nut 220.

In an exemplary embodiment, the outer coupling nut 222 includes a plurality of channels 250 along the interior thereof that receive corresponding portions of the plunger 224. When the plunger 224 is received in the channels 250, the plunger 224 may be locked relative to the outer coupling nut 222 such that rotation of the outer coupling nut 222 is transferred to the plunger 224. Optionally, the channels 250 may each extend to a circumferential groove 252. The groove 252 may receive a portion of the plunger 224. When the plunger 224 is received in the groove 252, the plunger 224 may be unlocked relative to the outer coupling nut 222 such that the outer coupling nut 222 is able to rotate relative to the plunger 224.

The outer coupling nut 222 includes a flange 254 extending from the interior wall thereof. The biasing mechanism 226 and/or plunger 224 may be captured by the flange 254. The outer coupling nut 222 includes a second retaining ring groove 256 near the rear 242. The second retaining ring groove 256 receives a second retaining ring 258 therein. The second retaining ring 258 may be used to axially constrain the outer coupling nut 222 to the shell 200. In an exemplary embodiment, the outer coupling nut 222 holds a clutch mechanism 260 near the rear 242. The clutch mechanism 260 may be used to prevent inadvertent rotation of the coupling mechanism 112 relative to the shell 200, which may prevent the parts from vibrating apart.

The plunger 224 includes a ring shaped body 270 having a front edge 272 and a rear edge 274. The biasing mechanism 226 is configured to press against the rear edge 274. Optionally, the biasing mechanism 226 may be a wave spring having multiple points of contact with the rear edge 274.

The plunger 224 includes a plurality of keys 276 extending radially outward from the body 270. The keys 276 are used to lock the plunger 224 to the inner coupling nut 220 and/or the outer coupling nut 222. The keys 276 are received in corresponding channels 250 in the outer coupling nut 222 and ride axially along the channels 250, such as to the groove 252. In an exemplary embodiment, the plunger 224 moves axially with respect to the inner and outer coupling nuts 220, 222.

The plunger 224 may be rotatably locked with respect to the inner and outer coupling nuts 220, 222 by the keys 276. The keys 276 are configured to be received in corresponding slots 234 of the inner coupling nut 220 and channels 250 of the outer coupling nut 222 to lock the inner coupling nut 220 to the outer coupling nut 222. When the keys 276 are held in the slots 234 and channels 250, rotation of the outer coupling nut 222 is transferred to the inner coupling nut 220 by the plunger 224. In one embodiment, the plunger 224 may be unlocked from the outer coupling nut 222 to allow free rotation of the outer coupling nut 222 relative to the inner coupling nut 220. In such embodiment, the plunger 224 does not rotate relative to the inner coupling nut 220. For example, rotation of the outer coupling nut 222 in a tightening direction 278 after the plug 104 is fully mated with the receptacle 102 causes the outer coupling nut 222 to rotate freely relative to the plunger 224 and the inner coupling nut 220. However, rotation of the outer coupling nut 222 in an untightening direction 279 causes corresponding rotation of the plunger 224 and inner coupling nut 220 in the untightening direction 279. In another embodiment, the plunger 224 may be unlocked from the inner coupling nut 220 to allow free rotation of the outer coupling nut 222 relative to the inner coupling nut 220. In such embodiment, the plunger 224 rotates with the outer coupling nut 222. For example, rotation of the outer coupling nut 222 in either a tightening direction 278 or an untightening direction 279 causes corresponding rotation of the plunger 224 in the tightening direction 278 or untightening direction 279, respectively.

The biasing mechanism 226 biases the plunger 224 forward such that the keys 276 are biased forward within the slots 234 and channels 250. During mating, as the plug 104 is coupled to the receptacle 102, the plunger 224 is configured to be pushed axially rearward until the keys 276 are no longer held in the channels 250 (or no longer held in the slots 234), at which time further rotation of the outer coupling nut 222 in the tightening direction 278 does not cause further rotation of the inner coupling nut 220.

The keys 276 include a leading edge 280 a trailing edge 282 and a ramped front edge 284 therebetween. The leading edge 280 is shorter than the trailing edge 282. The ramped front edge 284 is angled transverse relative to the front edge 272 and rear edge 274 of the body 270. The ramped keys 276 are able to be easily rotated out of the channels 250 (or the slots 234) when the plug 104 is fully mated to the receptacle 102.

Figure 3:
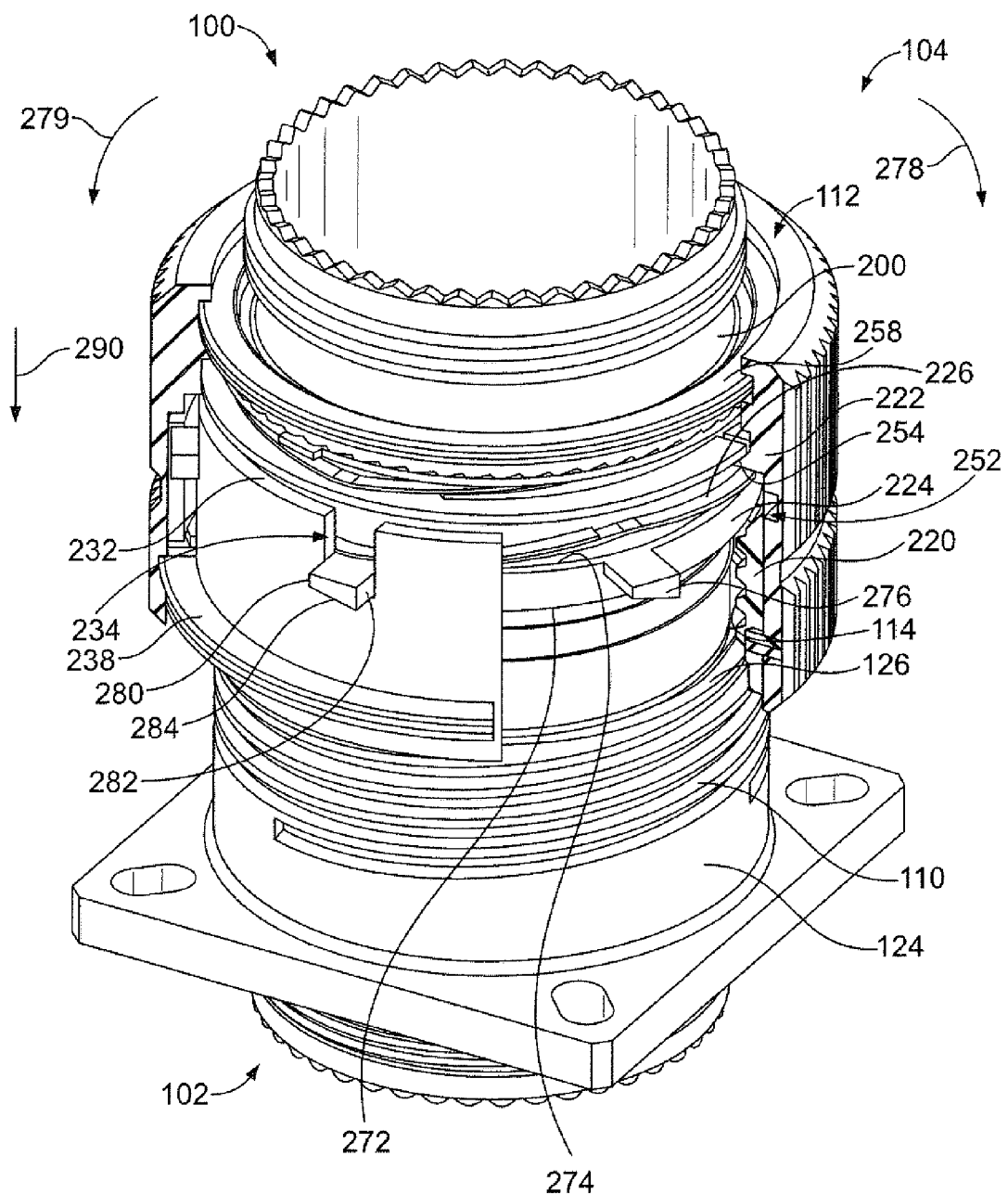
FIG. 3 illustrates the connector system showing a partial sectional view of the plug poised for mating with a receptacle.
Figure 4:
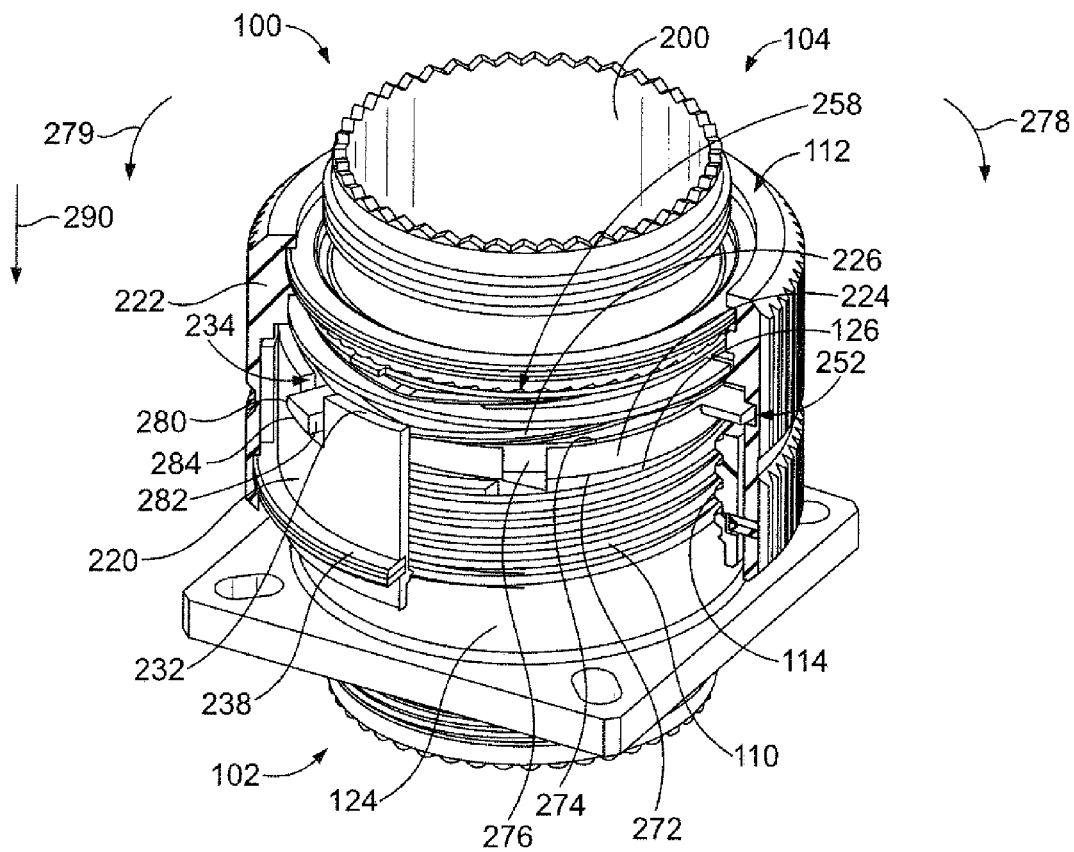
FIG. 4 illustrates the plug fully mated with the receptacle.

FIG. 3 illustrates the connector system 100 showing a partial sectional view of the plug 104 poised for mating with the receptacle 102. FIG. 4 illustrates the plug 104 fully mated with the receptacle 102. When assembled, the biasing mechanism 226 and plunger 224 are loaded into the outer coupling nut 222. The biasing mechanism 226 is positioned between the flange 254 and the rear edge 274 of the plunger 224.

The inner coupling nut 220 is received in the outer coupling nut 222 and secured thereto by the retaining ring 238. The keys 276 are received in corresponding slots 234 in the inner coupling nut 220. The biasing mechanism 226 presses the plunger 224 forward into the slots 234. The second retaining ring 258 secures the outer coupling nut 222 to the shell 200. The outer coupling nut 222 is able to rotate and spin freely relative to the shell 200 about the second retaining ring 258.

During tightening, the plunger 224 locks the inner coupling nut 220 to the outer coupling nut 222. Rotation of the outer coupling nut 222 is transferred to the inner coupling nut 220 by the plunger 224 such that the rotation of the outer coupling nut 222 causes the internal threads 114 of the inner coupling nut 220 to be threadably coupled to the external threads 110 of the receptacle 102. As the coupling mechanism 112 is tightened, the plug 104 is drawn onto and mated to the receptacle 102 in a mating direction 290. The coupling mechanism 112 is driven downward or forward along the shell 124 of the receptacle 102. Eventually, the leading edge 126 presses against the front edge 272 of the plunger 224. Further tightening of the coupling mechanism 112 causes the plunger 224 to move rearward relative to the inner coupling nut 220 and outer coupling nut 222. As the plunger 224 moves rearward (or as the inner coupling nut 220 and outer coupling nut 222 move forward relative to the plunger 224), the keys 276 are pushed axially rearward. In one embodiment, the keys 276 are pushed out of the channels 250 into the groove 252 to unlock the plunger 224 from the outer coupling nut 222. In another embodiment, the keys 276 are pushed out of the slots 234 to unlock the plunger 224 from the inner coupling nut 220. In both embodiments, the outer coupling nut 222 is automatically unlocked from the inner coupling nut 220 when the plug 104 is fully mated to the receptacle 102.

During mating, the leading edges 280 of the keys 276 are eventually positioned in the groove 252 of the outer coupling nut 222. As the outer coupling nut 222 is rotated in the tightening direction 278, the outer coupling nut 222 begins to rotate relative to the plunger 224. For example, the ramped front edge 284 rides along first corners 292 of the corresponding channels 250, further compressing the biasing mechanism 226. Eventually, the keys 276 are completely received in the groove 252 and ride along the groove 252 until the keys 276 are aligned with the next channel 250. When aligned with the channels 250, the biasing mechanism 226 causes the plunger 224 to spring forward such that the keys 276 are at least partially loaded into the corresponding channels 250. For example, at least the trailing edges 282 are loaded into the channels 250. As the plunger 224 is sprung forward, the plunger 224 may make an audible or tactile indication to the operator. Further advancement of the outer coupling nut 222 in the tightening direction 278 causes the outer coupling nut 222 to continue to spin relative to the inner coupling nut 220 and the plunger 224 with the keys 276 being sprung into successive channels 250 during rotation. In an exemplary embodiment, the coupling mechanism 112 provides tactile and/or audible feedback when the outer coupling nut 222 spins freely about the inner coupling nut 220. For example, the coupling mechanism 112 may click as the outer coupling nut 222 spins.

Optionally, during tightening, the coupling torque required to tighten the coupling mechanism 112 may build-up or increase as the plug 104 and the receptacle 102 are drawn together, such as due to increased forces between the contacts 128, 130 (both shown in FIG. 1). When the coupling mechanism 112 is fully tightened and unlocked, the outer coupling nut 222 is able to spin relative to the inner coupling nut 220 without the build-up of the coupling torque. The installer is able to feel the release or unlocking of the coupling mechanism 112, providing a tactile feedback to the installer that the plug 104 is fully mated to the receptacle 102.

When the coupling mechanism 112 is rotated in the untightening direction 279, the outer coupling nut 222 engages the plunger 224 and causes the plunger 224 to rotate in the untightening direction 279. Eventually, the keys 276 will be aligned with and spring into corresponding channels 250. Further untightening of the outer coupling nut 222 causes the trailing edges 282 of the keys 276 to abut against corresponding walls defining the channels 250 (e.g. trailing walls). The biasing mechanism 226 holds the keys 276 far enough into the channels 250 that the trailing walls push against the trailing edges 282. The plunger 224 is thus automatically locked to the outer coupling nut 222 as the coupling mechanism 112 is untightened. Untightening of the outer coupling nut 222 causes the inner coupling nut 220 to untighten. Further untightening of the outer coupling nut 222 causes the biasing mechanism 226 to push the plunger 224 axially deeper within the channel 250.

Figure 5:
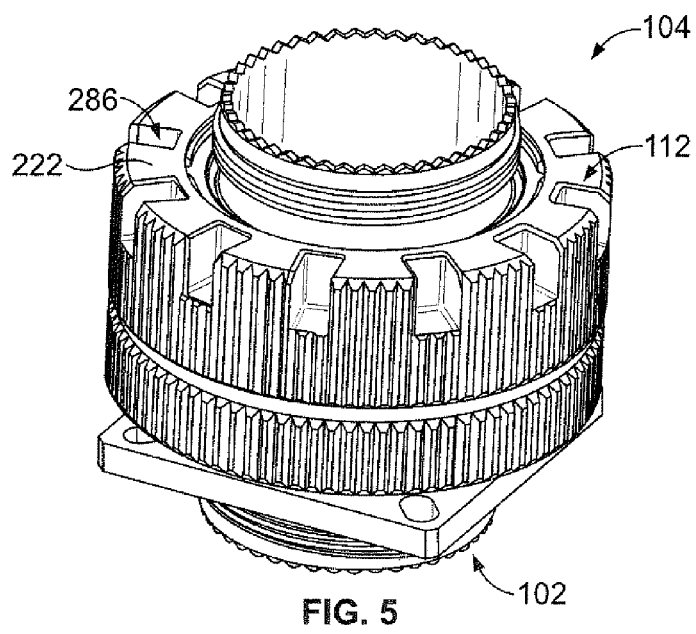
FIG. 5 illustrates the plug formed in accordance with an exemplary embodiment.

FIG. 5 illustrates the plug 104 with the coupling mechanism 112 having slots 286 in the outer coupling nut 222. The slots 286 enable using a torque wrench. The torque wrench can be set to disengage at a specified torque, preventing damage to the plug 104. For example, if foreign object debris is trapped between the plug 104 and the receptacle 102 or if one or more of the contacts are not properly mating (e.g. the contacts are bent or misaligned), mating may not be possible. The torque wrench will not allow overtightening to overcome the blocking force of the debris or contacts.

FIGS. 6 through 11 illustrate an exemplary mating and un-mating sequence of the plug 104 and receptacle 102. Portions of the plug 104 and receptacle 102 are removed to illustrate the mating sequence between the plug 104 and the receptacle 102.

FIG. 6 illustrates the plug 104 aligned with the receptacle 102 with the internal threads 114 initially aligned with the external threads 110. Rotation of the coupling mechanism 112 in the tightening direction 278 causes the internal threads 114 to be threadably coupled to the external threads 110. The coupling mechanism 112 is pulled or drawn downward or forward in the mating direction 290 onto the shell 124 of the receptacle 102.

FIG. 7 illustrates the plug 104 in a partially mated position. The leading edge 126 of the shell 124 of the receptacle 102 makes initial contact with the front edge 272 of the plunger 224. At this point, the keys 276 are still fully received in the corresponding channels 250 (shown in phantom). Further tightening of the coupling mechanism 112 causes the keys 276 to rise out of the channels 250.

FIG. 8 illustrates the plug 104 in a fully mated position with respect to the receptacle 102. The shell 124 of the receptacle 102 has pushed the plunger 224 reward such that the leading edge 280 of the key 276 is exterior of the channel 250 (e.g. above a first corner 292 defined at the intersection between the leading wall of the channel 250 and the groove 252). The trailing edge 282 is still interior of the channel 250 (e.g. below a second corner 294 defined at the intersection between the trailing wall of the channel 250 and the groove 252), however the outer coupling nut 222 is able to rotate relative to the plunger 224 and the inner coupling nut 220. The key 276 is no longer locked in the channel 250. Rotation of the outer coupling nut 222 in the tightening direction 278 causes the ramped front edge 284 to ride along the first corner 292 until the key 276 is clear of the channel 250.

FIG. 9 illustrates the plug 104 in a fully mated position with respect with to the receptacle 102, showing the coupling mechanism 112 rotated to a point where the key 276 is offset with respect to the channel 250. The key 276 rides along the front edge of the groove 252 as the outer coupling nut 222 is rotated.

Figure 10:
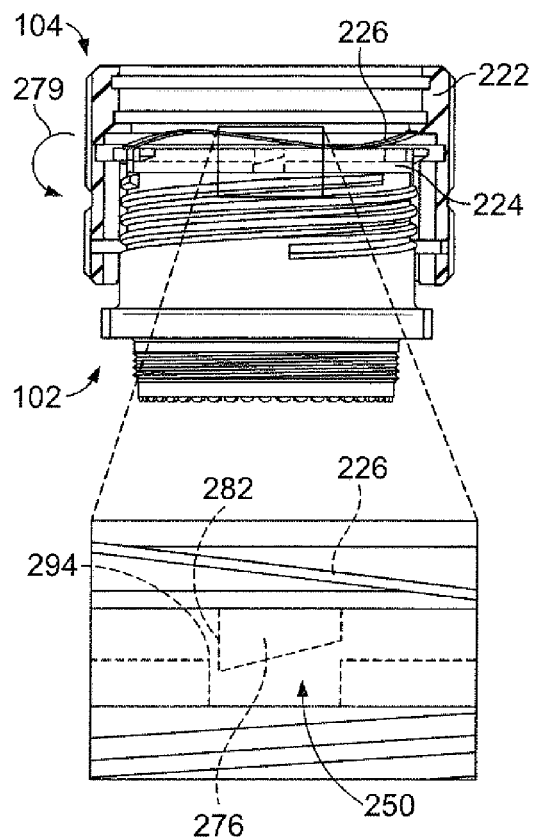

FIG. 10 illustrates the plug 104 in a fully mated position with the respect to the receptacle 102, showing the key 276 aligned with the corresponding channel 250. The trailing edge 282 is positioned interior of the channel 250. The biasing mechanism 226 forces the plunger 224 forward when the key 276 is aligned with the channel 250. Rotation of the outer coupling nut 222 in an untightening direction 279 causes the trailing wall of the channel 250 to interfere with and press against the trailing edge 282 of the key 276 at the second corner 294, thus locking the plunger 224 to the outer coupling nut 222. Further rotation of the outer coupling nut 222 in the untightening direction 279, causes the plunger 224 and the inner coupling nut 222 to be rotated in the untightening direction 279.

Figure 11:
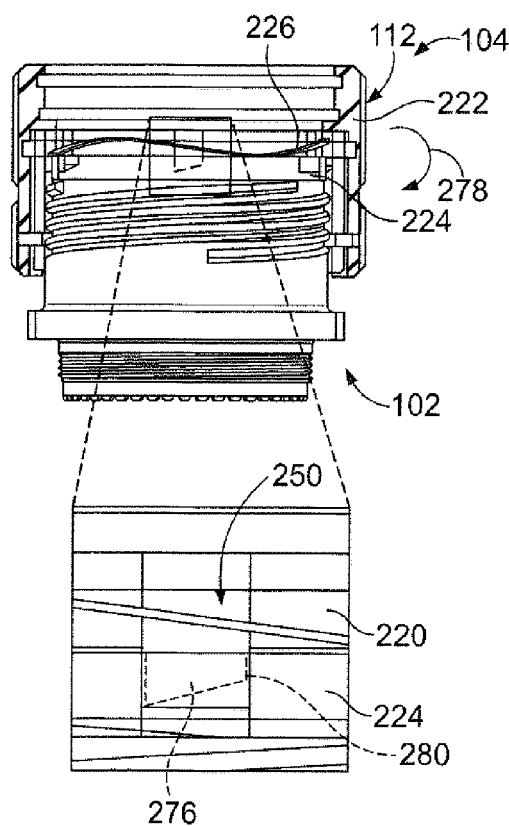

FIG. 11 illustrates the plug 104 in a partially unmated position with respect to the receptacle 102. Further untightening of the coupling mechanism 112 causes the biasing mechanism 226 to force the plunger keys 276 further into the channels 250 of the outer coupling nut 222. As the keys 276 are pushed downward into the channels 250, the leading edge 280 enters the channel 250. Rotation of the coupling mechanism 112 in either direction 278, 279 will cause corresponding rotation of the inner coupling nut 220.

In alternative embodiments, as discussed above, rather than the plunger 224 staying locked to the inner coupling nut 220 and having the outer coupling nut 222 rotate relative to the plunger 224 and the inner coupling nut 220, the plunger 224 may be locked to the outer coupling nut 222 and rotate at all times with the outer coupling nut 222. In such embodiments, the plunger 224 is unlocked from the inner coupling nut 220 in a similar manner as described above with reference to FIGS. 6-11. For example, the keys 276 may be unlocked from the slots 234 (shown in FIGS. 2 and 3) but remain captured in the channels 250. The leading edge 126 may press against the plunger 224 until the keys 276 are at least partially positioned out of the slots 234 (e.g. the leading edge 280). The keys 276 may ride along the rear 232 (shown in FIGS. 2 and 3) as the plunger 224 is rotated with the outer coupling nut 222. The biasing mechanism 226 may push the keys 276 into the slots 234 when the keys 276 are aligned with the slots 234. Such snapping of the plunger 224 into the inner coupling nut 220 may cause audible and/or tactile feedback to the installer.

Figure 12:
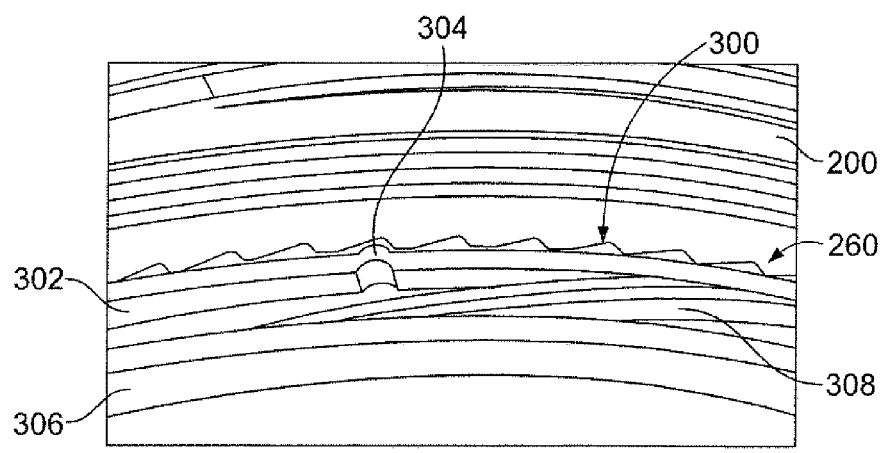
FIG. 12 illustrates a portion of the plug showing a clutch mechanism.

FIG. 12 illustrates a portion of the plug 104 showing the clutch mechanism 260. The shell 200 includes a plurality of ridges or notches 300. The clutch mechanism 260 includes a clutch plate 302 having a detent feature 304. The detent feature 304 is configured to be received in the notches 300 as the coupling mechanism 112 is rotated relative to the shell 200. A friction washer 306 may be held by the outer coupling nut 222 and/or the shell 200. A biasing mechanism 308, such as a wave spring may be positioned between the friction washer 306 and the clutch plate 302. The biasing mechanism 308 biases the clutch plate 302 against the shell 200. As the coupling mechanism 112 is tightened or untighten, the detent feature 304 is successfully received in notches 300 causing an audible ratchet sound. Additionally, the detent feature 304 may be held in the notch 300 to resist rotation of the coupling mechanism 112, such as to prevent the coupling mechanism from vibration in an untightening direction 279.

Figure 13:
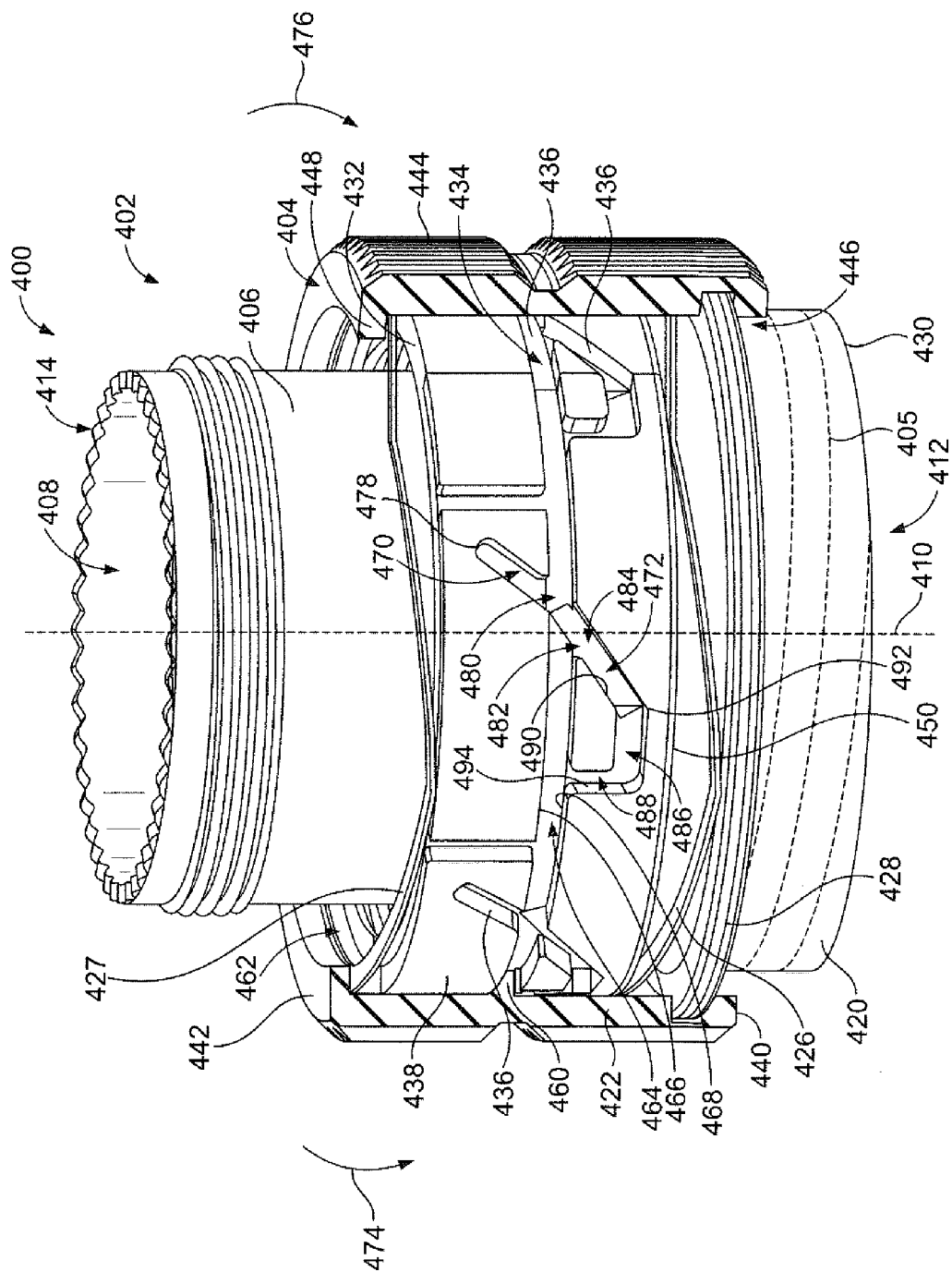
FIG. 13 illustrates a connector system formed in accordance with an exemplary embodiment.

FIG. 13 illustrates a connector system 400 formed in accordance with an exemplary embodiment. The connector system 400 includes a connector 402 configured to be coupled to the connector 102 (shown in FIG. 1). The connector 402 is configured to be plugged into the first connector 102 and may be referred to herein after as a plug connector 402 or simply a plug 402. The plug 402 includes a coupling mechanism 404 that is rotatable and includes a thread 405 that engages the thread 110 (shown in FIG. 1) of the receptacle 102. The coupling mechanism 404 is rotated and tightened to secure the plug 402 to the receptacle 102. The coupling mechanism 404 may be untightened to unmate the connectors 102, 402. The plug 402 holds a plurality of contacts (not shown), which may be similar to the contacts 130 (shown in FIG. 1).

The plug 402 includes a shell 406 defining a chamber 408 extending along a longitudinal axis 410 between a mating end 412 and a cable end 414 of the shell 406. The chamber 408 may receive an insert assembly (not shown) and/or contacts. The coupling mechanism 404 is coupled to the shell 406 and rotatable about the shell 406 and surrounds an exterior portion of the shell 406, such as at the mating end 412.

The coupling mechanism 404 includes an inner coupling nut 420 and an outer coupling nut 422. The outer coupling nut 422 may be locked to the inner coupling nut 420 during tightening and untightening of the coupling mechanism 404. The outer coupling nut 422 may be unlocked from the inner coupling nut 420 when the coupling mechanism 404 is fully tightened and the plug 402 is fully mated to the receptacle 102. In an exemplary embodiment, the outer coupling nut 422 is automatically unlocked from the inner coupling nut 420 without installer intervention or manipulation when the plug 402 is fully mated to the receptacle 102. During untightening, the outer coupling nut 422 again locks to the inner coupling nut 420 to cause the inner coupling nut 420 to rotate in an untightening direction.

In an exemplary embodiment, one or more biasing mechanisms 426, 427 may be used to bias the outer coupling nut 422 relative to the inner coupling nut 420, such as toward an unlocked position or toward a locked position. The biasing forces may be overcome. For example, the installer may push or pull the outer coupling nut 422 in a forward direction or a rearward direction during tightening or untightening of the coupling mechanism 404 to lock the outer coupling nut 422 to the inner coupling nut 420. When the installer releases the outer coupling nut 422, the outer coupling nut 422 may be automatically returned to the unlocked position. Optionally, the leading edge 126 (shown in FIG. 1) of the shell 124 of the receptacle 102 may operably engage the biasing mechanism 426 and/or a retaining ring 428 holding the biasing mechanism 426 and push the biasing mechanism upward to aid in unlocking the coupling mechanism 404. Once unlocked, the inner coupling nut 420 is no longer rotated with the outer coupling nut 422.

The inner coupling nut 420 includes a ring shaped body having the internal threads 405 on an interior of the inner coupling nut 420. The inner coupling nut 420 extends between a front 430 and a rear 432. The front 430 is configured to face the receptacle 102. The inner coupling nut 420 includes a track 434 defined by track walls 436 formed in an outer surface 438 of the inner coupling nut 420. The track 434 is configured to receive portions of the outer coupling nut 422 to lock the outer coupling nut 422 to the inner coupling nut 420.

The outer coupling nut 422 has a ring shaped body that extends between a front 440 and a rear 442. The outer coupling nut 422 may include gripping features 444 on an exterior of the outer coupling nut 422. For example, the exterior surface of the outer coupling nut 422 may have a knurled surface. The gripping features 444 may be gripped by the installer to rotate the coupling mechanism 404, such as to tighten or untighten the coupling mechanism 404.

The outer coupling nut 422 includes an internal pocket 446 at the front 440 that receives the inner coupling nut 420. The outer coupling nut 422 includes a cap 448 extending over the pocket 446. The cap 448 may be used to axially secure the inner coupling nut 420 relative to the outer coupling nut 422 in the pocket 446. In an exemplary embodiment, the biasing mechanism 427 is positioned between the cap 448 and the inner coupling nut 420. The biasing mechanism 426 may be captured between the retaining ring 428 and a shoulder 450 of the inner coupling nut 420. Optionally, the biasing mechanisms 426, 427 may be wave springs.

The outer coupling nut 422 includes one or more posts 460 that extend into the pocket 446 of the outer coupling nut 422. The inner coupling nut 420 is configured to be received in the pocket 446. The posts 460 are received in the track 434 of the inner coupling nut 420. The posts 460 are able to move in the track 434 such that the outer coupling nut 422 has one or more predefined paths of relative movement with respect to the inner coupling nut 420. The posts 460 engage the track walls 436 and the track walls 436 define the predetermined paths of movement of the posts 460 in the track 434.

The track 434 includes a circumferential groove 464 extending entirely circumferentially around the exterior of inner coupling nut 420. The circumferential groove 464 is defined by an upper track wall 466 and a lower track wall 468. The upper and lower track walls 466, 468 may be parallel to one another and may be spaced apart by distance generally equal to, or slightly wider than, the posts 460. In an exemplary embodiment, the upper and lower track walls 466, 468 extend horizontally about the inner coupling nut 420. When the posts 460 are received in the circumferential groove 464, the outer coupling nut 422 is freely rotatable about the inner coupling nut 420. The outer coupling nut 422 is able to be rotated 360° around the inner coupling nut 420 when the posts 460 are located in the circumferential groove 464. Optionally, the biasing mechanisms 426, 427 cooperate to hold the inner coupling nut 420 at a neutral axial position relative to the outer coupling nut 422 with the posts 460 in the groove 464.

The track 434 includes a plurality of untightening slots 470 extending transversely upward from the circumferential groove 464 and a plurality of tightening slots 472 extending transversely downward from the circumferential groove 464. The untightening slots 470 extend generally in an untightening direction 474 of the coupling mechanism 404 (e.g. counter-clockwise), while the tightening slots 472 extend generally in a tightening direction 476 of the coupling mechanism 404 (e.g. clockwise). As such, when the outer coupling nut 422 is rotated in the untightening direction 474, the posts 460 may be transitioned naturally into the untightening slots 470 to lock the outer coupling nut 422 to the inner coupling nut 420 to transfer the rotational movement of the outer coupling nut 422 in the untightening direction 474 to the inner coupling nut 420. For example, the outer coupling nut 422 may be pulled rearward relative to the inner coupling nut 420 against the biasing force of the biasing mechanism 427 during untightening to pull the posts 460 into the untightening slots 470. Similarly, when the outer coupling nut 422 is rotated in the tightening direction 476, the posts 460 may transition naturally into the tightening slots 472 to lock the outer coupling nut 422 to the inner coupling nut 420 to transfer the rotational movement of the outer coupling nut 422 in the tightening direction 476 to the inner coupling nut 420. For example, the outer coupling nut 422 may be pushed forward relative to the inner coupling nut 420 against the biasing force of the biasing mechanism 426 during tightening to push the posts 460 into the tightening slots 472.

In an exemplary embodiment, the untightening slot 470 has an end 478. The posts 460 may be rotated into the untightening slots 470 until the posts 460 engage the ends 478. When the posts 460 engage the ends 478 the outer coupling nut 422 is fully locked to the inner coupling nut 420 and all rotation of the outer coupling nut 422 is transferred to the inner coupling nut 420 to untighten the inner coupling nut 420 from the receptacle connector 102. Optionally, even when the posts 460 are only partially received in the untightening slots 470, the rotation of the outer coupling nut 422 may be transferred to the inner coupling nut 420, such as by pressing against the track walls 436 defining the untightening slots 470.

In an exemplary embodiment, the biasing mechanism 426 biases the outer coupling nut 422 rearward or upward relative to the inner coupling nut 420. As the outer coupling nut 422 is rotated in the untightening direction 474, when the posts 460 are aligned with corresponding entrances 480 to the untightening slots 470, the biasing mechanism 426 forces the posts 460 into the entrances 480 of the untightening slots 470. The untightening slots 470 are angled transverse and upward with respect to the circumferential groove 464 to allow the posts 460 to naturally rotate into the untightening slots 470. However, in alternative embodiments, the untightening slots 470 may extend generally perpendicular with respect to the circumferential groove 464.

When the posts 460 extend into the untightening slots 470, the outer coupling nut 422 may move axially reward with respect to the inner coupling nut 420 such that the cap 448 is moved rearward relative to the rear 432 of the inner coupling nut 420. Optionally, the operator may pull rearward on the outer coupling nut 422 as the outer coupling nut 422 is rotated in the untightening direction 474 to pull the posts 460 into the untightening slots 470. When the outer coupling nut 422 is released, the outer coupling nut 422 may be automatically returned to a nominal position relative to the inner coupling nut 420. For example, the posts 460 may be automatically ejected from the untightening slots 470 into the circumferential groove 464. The biasing mechanism 426 may cause the outer coupling nut 422 to return to the nominal position.

Due to the angled nature of the untightening slots 470 in the untightening direction 474, when the outer coupling nut 422 is rotated in the tightening direction 476, the posts 460 bypass the untightening slots 470 such that the outer coupling nut 422 rotates freely in the circumferential groove 464 without being caught in the untightening slots 470.

The tightening slots 472 have entrances 482 thereto. The tightening slots 472 have ramped segments 484, release segments 486 and return segments 488 that connect the release segments 486 with the circumferential grove 464. The entrances 482 open to the ramped segments 484. The ramped segments 484 are defined by ramped track walls 490 that are angled transverse to the circumferential groove 464. The ramped segments 484 extend from the entrances 482 to corresponding ends 492 thereof. The release segments 486 are provided at the ends 492 of the ramped segments 484.

During tightening, the posts 460 are transitioned into the ramped segments 484 where the posts 460 engage the ramped track walls 490. Rotation of the outer coupling nut 422 in the tightening direction 476 is transferred to the inner coupling nut 420 by the pressing force of the post 460 on the ramped track walls 490. As the coupling mechanism 404 is tightened to the receptacle 102, the mating forces may increase, such as when the contacts begin to mate. A coupling torque is developed to overcome the axial mating forces of the contacts. If spring supported optical terminals or contacts are utilized, the coupling torque may progressively increase. The posts 460 transfer the coupling torque to the ramped track walls 490 to cause the inner coupling nut 420 to rotate. The increase in coupling torque may cause the posts 460 to be driven further into the ramped segments 484 along the ramped track walls 490. The ramped track walls 490 may have a predefined angle and predefined length that corresponds to the require mating force for fully mating the plug 402 to the receptacle 102.

Once the posts 460 enter the release segments 486, the tightening forces of the outer coupling nut 422 onto the inner coupling nut 420 are released. Rotation of the outer coupling nut 422 when the posts 460 are in the release segments 486 is not transferred to the inner coupling nut 420. The slipping or release of the forces is noticeable by the installer giving a tactile indication that the plug 402 is fully mated with the receptacle 102.

The return segments 488 have generally vertical return track walls 494 that transition the posts 460 back to the circumferential groove 464. As the posts 460 travel through the release segments 486 and engage the return track walls 494 the installer will feel an abrupt change from free rotation of the outer coupling nut 422 to large resistance as the posts 460 press against the return tack walls 494. Such resistance provides an indication to the installer to release the outer coupling nut 422. Optionally, the biasing mechanism 426 may automatically return the outer coupling nut to the nominal position with the posts 460 in the circumferential groove 464. The outer coupling nut 422 is then unlocked from the inner coupling nut 420 to allow free rotation of the outer coupling nut 422 relative to the inner coupling nut 420.

Figure 14:
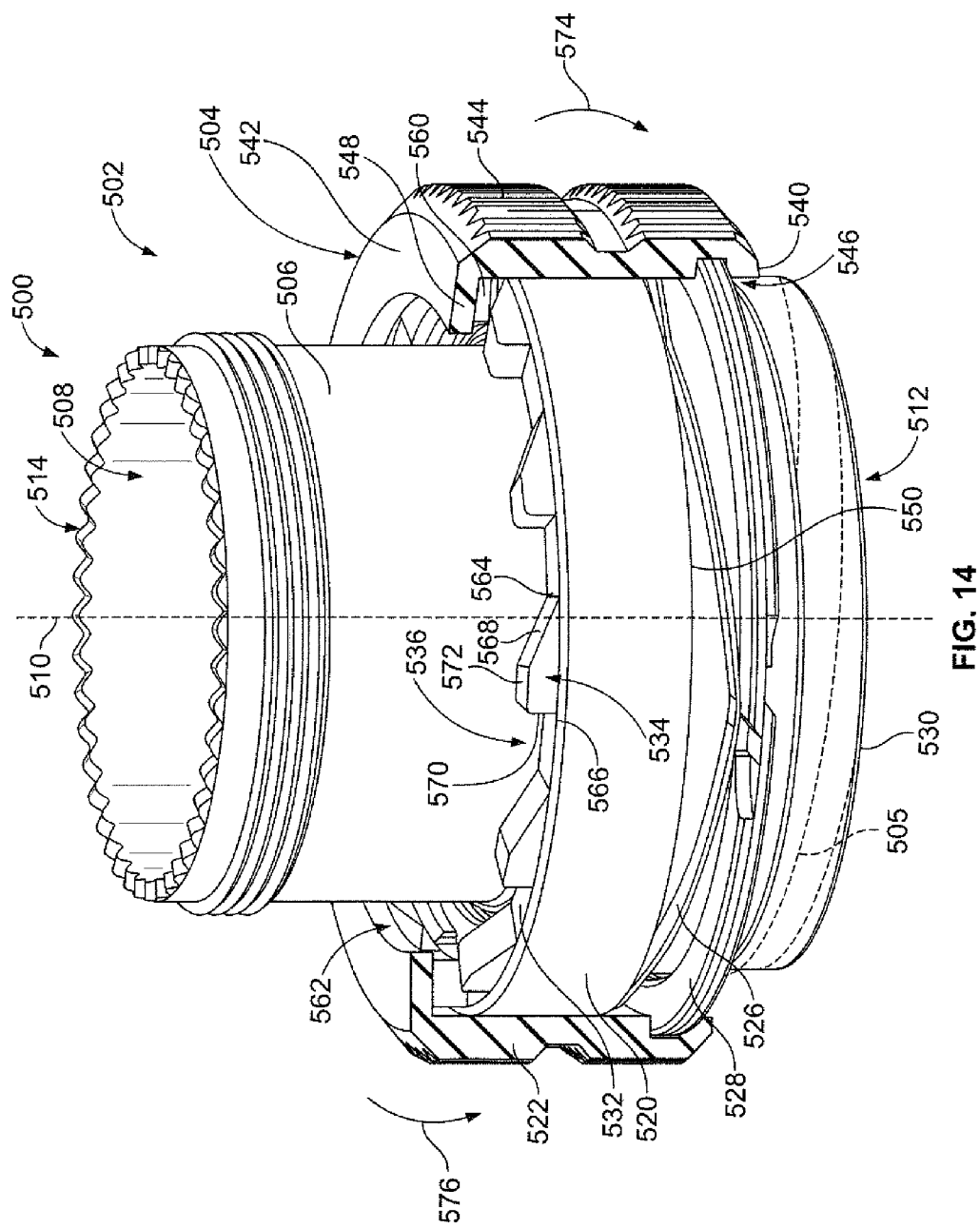
FIG. 14 illustrates a connector system formed in accordance with an exemplary embodiment.

FIG. 14 illustrates a connector system 500 formed in accordance with an exemplary embodiment. The connector system 500 includes a connector 502 configured to be coupled to the connector 102 (shown in FIG. 1). The connector 502 is configured to be plugged into the first connector 102 and may be referred to herein after as a plug connector 502 or simply a plug 502. The plug 502 includes a coupling mechanism 504 that is rotatable and includes an internal thread 505 that engages the external thread 110 (shown in FIG. 1) of the receptacle 102. The coupling mechanism 504 is rotated and tightened to secure the plug 502 to the receptacle 102. The coupling mechanism 504 may be untightened to unmate the connectors 102, 502. The plug 502 holds a plurality of contacts (not shown), which may be similar to the contacts 130 (shown in FIG. 1).

The plug 502 includes a shell 506 defining a chamber 508 extending along a longitudinal axis 510 between a mating end 512 and a cable end 514 of the shell 506. The chamber 508 is sized and shaped to receive an insert assembly (not shown) that holds the contacts. The coupling mechanism 504 is coupled to the shell 506 and surrounds an exterior portion of the shell 506, such as at the mating end 512.

The coupling mechanism 504 includes an inner coupling nut 520 and an outer coupling nut 522. The outer coupling nut 522 may be locked to the inner coupling nut 520 during tightening and untightening of the coupling mechanism 504. The outer coupling nut 522 may be unlocked from the inner coupling nut 520 when the coupling mechanism 504 is fully tightened and the plug 502 is fully mated to the receptacle 102. In an exemplary embodiment, the outer coupling nut 522 is automatically unlocked from the inner coupling nut 520 without installer intervention or manipulation when the plug 502 is fully mated to the receptacle 102. During untightening, the outer coupling nut 522 again locks to the inner coupling nut 520 to cause the inner coupling nut 520 to rotate in an untightening direction.

In an exemplary embodiment, a biasing mechanism 526 is used to bias the outer coupling nut 522 relative to the inner coupling nut 520 toward the locked position. The biasing force may be overcome during tightening of the coupling mechanism 504 until the plug 502 is fully mated, at which time the outer coupling nut 522 may be unlocked from the inner coupling nut 520. Optionally, the leading edge 126 (shown in FIG. 1) of the shell 124 of the receptacle 102 may operably engage the biasing mechanism 526 and/or a retaining ring 528 holding the biasing mechanism 526 and push the biasing mechanism upward to aid in unlocking the coupling mechanism 504. Once unlocked, the inner coupling nut 520 is no longer rotated with the outer coupling nut 522.

The inner coupling nut 520 includes a ring shaped body having the internal threads 505 on an interior of the inner coupling nut 520. The inner coupling nut 520 extends between a front 530 and a rear 532. The front 530 is configured to face the receptacle 102. The inner coupling nut 520 includes a plurality of ramped steps 534 extending from the rear 532 and disposed at different circumferential positions along the rear 532. The inner coupling nut 520 includes a plurality of spaces 536 between the ramped steps 534. The outer coupling nut 522 is freely rotatable relative to the inner coupling nut 520 through the spaces between the ramped steps 534.

The outer coupling nut 522 has a ring shaped body that extends between a front 540 and a rear 542. The outer coupling nut 522 may include gripping features 544 on an exterior of the outer coupling nut 522. For example, the exterior surface of the outer coupling nut 522 may have a knurled surface. The gripping features 544 may be gripped by the installer to rotate the coupling mechanism 504, such as to tighten or untighten the coupling mechanism 504.

The outer coupling nut 522 includes a pocket 546 at the front 540 that receives the inner coupling nut 520. The outer coupling nut 522 includes a cap 548 extending over the pocket 546. The cap 548 may be used to axially secure the inner coupling nut 520 relative to the outer coupling nut 522 in the pocket 546. The biasing mechanism 526 may bias the outer coupling nut 522 relative to the inner coupling nut 520 until the rear 532 of the inner coupling nut 520 engages the cap 548. For example, the biasing mechanism 526 may be captured between the retaining ring 528 and a shoulder 550 of the inner coupling nut 520. The biasing mechanism 526 presses against the shoulder 550 and the retaining ring 528 to push the surfaces apart. Optionally, the biasing mechanism 526 may be a wave spring.

The outer coupling nut 522 includes one or more detents 560 extending into a cavity 562 of the outer coupling nut 522. The detents 560 may be provided at the rear 542. For example, the detents 560 may extend from the cap 548. The detents 560 are configured to interact with the ramped steps 534 to tighten and untighten the inner coupling nut 520. The detents 560 may lockably engage the ramped steps 534 to tighten and untighten the inner coupling nut 520. The detents 560 may be automatically released from the ramped steps 534 when the plug is fully mated to the receptacle 102.

The ramped steps 534 provide surfaces for the detents 560 to engage during tightening and untightening of the inner coupling nut 520. By having the ramped steps 534 angled, the detent 560 may release from the ramped steps 534 to unlock the outer coupling nut 522 from the inner coupling nut 520. Each ramped step 534 extends between a first side 564 and a second side 566. The ramped step 534 has an angled ramp wall 568 at the first side 564. The biasing mechanism 526 forces the detent 560 to remain in contact with the ramp wall 568 as the detent 560 rides up the ramp wall 568. The ramped step 534 has a stop wall 570 at the second side 566. Optionally, the ramped step 534 may include a flat top 572 extending between the ramp wall 568 and the stop wall 570. The biasing mechanism 526 may be compressed as the detent 560 passes over the ramped step 534 and may force the detent to snap into the space 236 after the detent 560 passes over the ramped step 534.

The detent 560 engages the ramp wall 568 as the outer coupling nut 522 is rotated in a tightening direction 574. The detent 560 engages the stop wall 570 as the outer coupling nut 522 is rotated in an untightening direction 576. The outer coupling nut 522 causes the inner coupling nut 520 to rotate in the tightening direction 574 when the detent 560 engages the ramp wall 568. The outer coupling nut 522 causes the inner coupling nut 520 to rotate in the untightening direction 576 when the detent 560 engages the stop wall 570.

The detent 560 is released from the ramp wall 568 when the plug 502 is fully mated with the receptacle 102. For example, when the outer coupling nut 522 is rotated in the tightening direction 574, a coupling torque is developed between the plug 502 and the receptacle 102. The coupling torque is developed to overcome the axial mating forces of the contacts of the plug 502 and the contacts of the receptacle 102. Optionally, if spring supported optical termini or contacts or used, the coupling torque may progressively increase. The detent 560 transfers the coupling torque to the ramped steps 534 of the inner coupling nut 520. At the fully mated state, the necessary connector coupling torque is overcome and the detent 560 is released from the ramped step 534.

A releasing coupling torque is achieved when the plug 502 is fully mated with the receptacle 102. Any coupling torque beyond the releasing coupling torque required to fully mate the plug 502 and the receptacle 102 may cause over-tightening or damage to the components. In an exemplary embodiment, when the coupling torque is at the releasing coupling torque, the detent 560 automatically releases from the ramped step 534. For example, the angle of the ramp wall 568 and the length of the ramp wall 568 may be selected to achieve the releasing coupling torque. When the coupling torque is less than the releasing coupling torque, the detent 560 engages and presses against the ramp wall 568. When the coupling torque reaches the releasing coupling torque the friction between the detent 560 and the ramp wall 568 is overcome causing the detent 560 to slide along the ramp wall 568 and pass over the ramped step 534. The biasing mechanism 526 provides resistance for the detent 560 in overcoming the ramp wall 568.

When the detent 560 releases from the ramp wall 568 the detent 560 may pass along the flat top 572. As the outer coupler nut 522 is further rotated in the tightening direction, the detent 560 is displaced beyond the stop wall 570. The detent 560 slips over the ramped step 534 and then snaps back into the space 536 between the ramped step 534 and the next ramped step 534. The biasing mechanism 526 may cause the detent 560 to snap back toward the rear 532. As the detent 560 passes over the ramped step 534, a positive tactile and audible feedback is provided to the operator. Connector over-tightening is prevented since further rotation of the outer coupling nut 522 in the tightening direction 574 does not further tighten the plug 502 onto the receptacle 102. Rather, the detents 560 progressively slip over the ramped steps 534, so the outer coupling nut 522 rotates, or slips, relative to the inner coupling nut 520.

To unmate the plug 502 from the receptacle 102, the outer coupling ring 522 is rotated in the untightening direction 576. As the outer coupling nut 522 is rotated in the untightening direction 576, the detent 560 engages and presses against a stop wall 570 of the corresponding ramped step 534. Continued rotation of the outer coupling nut 522 in the untightening direction 576 is transferred to the inner coupling nut 520, which is likewise rotated in the untightening direction 576.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A connector comprising:
a shell having a chamber, the shell having a mating end configured to be mated with a mating connector, the shell holding at least one contact; and
a coupling mechanism rotatable about the shell in a tightening direction and in an untightening direction, the coupling mechanism comprising an inner coupling nut and an outer coupling nut separate from the inner coupling nut, the inner coupling nut having threads configured to be threadably coupled to the mating connector, the inner coupling nut having a track defined by track walls formed into an outer surface of the inner coupling nut, the outer coupling nut having a cavity receiving the inner coupling nut, the outer coupling nut having a post extending into the cavity and being received in the track, the post engaging the track walls to tighten and untighten the inner coupling nut to the mating connector, the post being released from the track wall into the track when the connector is fully mated to the mating connector such that the outer coupling nut is freely rotatable in the track in the tightening direction when the connector is fully mated to the mating connector.

2. The connector of claim 1, wherein the outer coupling nut is axially displaceable relative to the inner coupling nut.

3. The connector of claim 1, further comprising a biasing mechanism between the inner coupling nut and the outer coupling nut.

4. The connector of claim 1, wherein the track includes a circumferential groove, when the post is received in the circumferential groove, the outer coupling nut is freely rotatable about the inner coupling nut.

5. The connector of claim 1, wherein the track includes a circumferential groove having an upper track wall and a lower track wall, the track having an untightening slot extending transversely upward from the upper track wall, the post being received in the untightening slot when the outer coupling nut is rotated in the untightening direction.

6. The connector of claim 5, further comprising a biasing mechanism between the inner coupling nut and the outer coupling nut, the biasing mechanism biasing the post into the untightening slot.

7. The connector of claim 5, wherein the post bypasses the untightening slot when the outer coupling nut is rotated in the tightening direction.

8. The connector of claim 1, wherein the track includes a circumferential groove having an upper track wall and a lower track wall, the track having a tightening slot extending transversely downward from the lower track wall, the post configured to be received in the tightening slot when the outer coupling nut is rotated in the tightening direction.

9. The connector of claim 8, wherein the tightening slot includes a ramped segment defined by a ramped track wall angled transverse to the circumferential groove, the post pressing against the ramped track wall as the outer coupling nut is rotated in the tightening direction to cause the inner coupling nut to rotate in the tightening direction until the connector is fully mated to the mating connector afterwhich the outer coupling nut rotates relative to the inner coupling nut in the tightening direction.

10. The connector of claim 9, wherein the tightening slot further comprises a release segment at an end of the ramped segment, the post releasing from the ramped track wall in the release segment, the outer coupling nut rotating relative to the inner coupling nut as the post passes through the release segment.

11. The connector of claim 10, wherein the tightening slot further comprises a return segment connecting the release segment and the circumferential groove, the post passing through the return segment to the circumferential groove.

12. The connector of claim 8, further comprising a biasing mechanism between the inner coupling nut and the outer coupling nut, the biasing mechanism biasing the post into the tightening slot.

13. The connector of claim 8, wherein the post bypasses the tightening slot when the outer coupling nut is rotated in an untightening direction.

14. A connector comprising:
a shell having a chamber, the shell having a mating end configured to be mated with a mating connector, the shell holding at least one contact; and
a coupling mechanism rotatable about the shell in a tightening direction and in an untightening direction, the coupling mechanism comprising an inner coupling nut and an outer coupling nut separate from the inner coupling nut, the inner coupling nut having threads configured to be threadably coupled to the mating connector, the inner coupling nut having a track defined by track walls formed into an outer surface of the inner coupling nut, the track comprising a circumferential groove extending entirely around the inner coupling nut, a tightening slot extending from the circumferential groove and an untightening slot extending from the circumferential groove, the outer coupling nut having a cavity receiving the inner coupling nut, the outer coupling nut having a post extending into the cavity, the post being received in the track, the post being received in the circumferential groove to allow the outer coupling nut to rotate freely relative to the inner coupling nut in both the untightening and the tightening directions, the post being received in the untightening slot during rotation of the outer coupling nut in the untightening direction to force the inner coupling nut to rotate in the untightening direction, the post being received in the tightening slot during rotation of the outer coupling nut in the tightening direction to force the inner coupling nut to rotate in the tightening direction.

15. The connector of claim 14, wherein the outer coupling nut is axially displaceable relative to the inner coupling nut.

16. The connector of claim 14, further comprising a first biasing mechanism between the inner coupling nut and the outer coupling nut and a second biasing mechanism between the inner coupling nut and the outer coupling nut, the first and second biasing mechanisms biasing the outer coupling nut relative to the inner coupling nut to align the posts with the track.

17. The connector of claim 14, wherein the circumferential groove has an upper track wall and a lower track wall, the untightening slot extending transversely upward from the upper track wall, the tightening slot extending transversely downward from the lower track wall.

18. The connector of claim 14, wherein the tightening slot includes a ramped segment defined by a ramped track wall angled transverse to the circumferential groove, the post pressing against the ramped track wall to cause the inner coupling nut to rotate in the tightening direction.

19. The connector of claim 18, wherein the tightening slot further comprises a release segment at an end of the ramped segment, the post releasing from the ramped track wall in the release segment, the outer coupling nut rotating relative to the inner coupling nut as the post passes through the release segment.

20. The connector of claim 19, wherein the tightening slot further comprises a return segment connecting the release segment and the circumferential groove, the post passing through the return segment to the circumferential groove.

* * * * *